United States Patent
Köhler et al.

(10) Patent No.: US 7,370,629 B2
(45) Date of Patent: May 13, 2008

(54) METHOD FOR OPERATING AN INTERNAL COMBUSTION ENGINE WITH DIRECT FUEL INJECTION DURING A POST-START PHASE

(75) Inventors: Bernd Köhler, Donzdorf (DE);
Christoph Lux, Stuttgart (DE);
Michael Oechsle, Sindelfingen (DE);
Andreas Spieth, Dettingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 11/580,709

(22) Filed: Oct. 13, 2006

(65) Prior Publication Data

US 2007/0056553 A1  Mar. 15, 2007

Related U.S. Application Data

(63) Continuation-in-part of application No. PCT/EP2005/003542, filed on Apr. 5, 2005.

(30) Foreign Application Priority Data

Apr. 14, 2004  (DE) .................... 10 2004 017 990

(51) Int. Cl.
*F02D 41/06* (2006.01)
*F02D 41/40* (2006.01)
*F02B 17/00* (2006.01)

(52) U.S. Cl. ................. 123/295; 123/299; 123/305
(58) Field of Classification Search ........... 123/295, 123/299, 300, 305
See application file for complete search history.

(56) References Cited

U.S. PATENT DOCUMENTS

| | | | |
|---|---|---|---|
| 6,659,072 B2 * | 12/2003 | Heinzelmann | 123/299 |
| 6,742,500 B2 * | 6/2004 | Sauler et al. | 123/406.21 |
| 6,789,527 B2 * | 9/2004 | Sauler et al. | 123/406.21 |
| 6,899,077 B2 * | 5/2005 | Wagner et al. | 123/295 |

FOREIGN PATENT DOCUMENTS

| | | |
|---|---|---|
| DE | 198 15 226 | 10/1994 |
| DE | 102 42 227 | 3/2004 |
| DE | 103 05 941 | 8/2004 |
| DE | 101 14 054 | 9/2004 |
| EP | 1 223 329 | 7/2002 |
| WO | WO 03/067062 | 8/2003 |

* cited by examiner

*Primary Examiner*—T. M Argenbright
(74) *Attorney, Agent, or Firm*—Klaus J. Bach

(57) ABSTRACT

In a method for operating a spark-ignition internal combustion engine with direct fuel injection in the post-start phase at low temperatures, fuel is supplied to the combustion air in a pilot injection ($M_H$) of a first fuel quantity during an intake stroke of the internal combustion engine such that the pilot injection ($M_H$) forms a homogeneous, lean air/fuel mixture ($\lambda>1$) in substantially the entire combustion chamber, and a main injection ($M_S$) of a second fuel quantity is subsequently injected into the combustion chamber during a compression stroke directly before the ignition time (ZT), said main injection ($M_S$) forming in the region of the spark plug a stratified, rich air/fuel mixture ($\lambda<1$), which is then ignited by the spark plug.

11 Claims, 3 Drawing Sheets

METHOD FOR OPERATING AN INTERNAL COMBUSTION ENGINE WITH DIRECT FUEL INJECTION DURING A POST-START PHASE

This is a Continuation-in-Part application of pending international patent application PCT/EP2005/003542 filed Apr. 5, 2005 and claiming the priority of German patent application 10 2004 017 990.5 filed Apr. 13, 2004.

BACKGROUND OF THE INVENTION

The invention relates to a method for operating a spark-ignition internal combustion engine, in particular a spark-ignition internal combustion engine with direct fuel injection in the post-start phase at low temperatures.

In a conventional injection strategy in direct-injection gasoline engines and gasoline engines with intake pipe injection, the engine is operated in the so-called homogeneous operating mode in the initial seconds after a cold start at low temperatures of −30° C. to 0° C. Here, in the direct-injection gasoline engine, the injection into the combustion chamber takes place during the intake stroke. As a result of the intake air flowing in and the flows generated in the combustion chamber by the downward movement of the piston, the injected fuel is mixed uniformly with the fresh air. The charge thus generated in the combustion chamber is completely homogenized, that is to say substantially the same air/fuel mixture is present in the entire combustion chamber.

In order to ensure reliable combustion of the fresh mixture, the air/fuel mixture in the vicinity of the spark plug must be slightly rich, that is to say have a slight excess of fuel, at the time of ignition. However, since the mixture is uniformly/homogeneously distributed throughout the entire combustion chamber in the homogeneous operating mode, a slightly rich mixture must be generated in the entire combustion chamber. As a result of the lack of oxygen during combustion, this brings about increased emissions of carbon monoxide and unburned hydrocarbons. The incomplete transformation of the energy in the fuel also results in increased fuel consumption.

During a cold start at very low temperatures, fuel condenses out of the fresh charge onto the still-cold combustion chamber walls and onto the piston head in the post-start phase. This fuel is then no longer available for combustion and must be compensated for by an increased injection quantity in order to prevent the air/fuel mixture from becoming too lean. An overly lean mixture would, as a result of its worse combustibility at the still-low combustion chamber temperatures after the cold start, lead to rough engine operation or even to instances of misfiring. Neither is acceptable for reasons of driving comfort and pollutant emissions.

The fuel which is condensed onto the combustion chamber wall and onto the piston head is present there in liquid form. Said fuel is no longer involved in the actual torque-generating combustion. The evaporated fuel in the direct vicinity of the cold combustion chamber walls is also no longer involved in the combustion process as a result of so-called "quenching". Here, the combustion is also deprived of heat and therefore energy by the cold combustion chamber walls. This leads to a reduction in the combustion speed, to the where the flame may be extinguished in the vicinity of the combustion chamber wall. As a result, a layer of unburned hydrocarbons forms in front of the combustion chamber wall. During the exhaust process, the upward-moving piston scrapes the fuel from the combustion chamber wall and pushes it out, unburned, through the open exhaust valve into the exhaust duct. This results in high HC emissions.

The fuel which is not involved in the combustion process must also be compensated for by an increased injection quantity, so that a sufficient fuel and therefore energy quantity for generating the required torque for engine operation is available in those regions of the combustion chamber in which the fresh charge can be involved in the combustion process. Specifically after a cold start at very low temperatures, this requires very high fuel injection quantities which can be a multiple of the injection quantity at full load. In this context, it is also significant that the injection quantity required after the cold start determines the minimum feed quantity of an electric fuel pump or of a high pressure pump.

It is therefore an object of the invention to provide a method for operating an internal combustion engine which avoids the above described problems of a conventional homogeneous operating mode. The method for operating the internal combustion engine in a post-start phase should also in particular reduce the required injection quantity at very low temperatures, permitting a further reduction in pollutant emissions and permitting a required high pressure pump to be relatively small.

SUMMARY OF THE INVENTION

In a method for operating a spark-ignition internal combustion engine with direct fuel injection in the post-start phase at low temperatures, fuel is supplied to the combustion air in a pilot injection ($M_H$) of a first fuel quantity during an intake stroke of the internal combustion engine such that the pilot injection ($M_H$) forms a homogeneous, lean air/fuel mixture ($\lambda > 1$) in substantially the entire combustion chamber, and a main injection ($M_S$) of a second fuel quantity is subsequently injected into the combustion chamber during a compression stroke directly before the ignition time (ZT), said main injection ($M_S$) forming in the region of the spark plug a stratified, rich air/fuel mixture ($\lambda < 1$), which is then ignited by the spark plug.

In the method according to the invention for operating a spark-ignition internal combustion engine with direct fuel injection in the post-start phase, a combustion chamber is supplied with combustion air; fuel is injected into the combustion chamber by means of a fuel injector; and an air/fuel mixture formed in the combustion chamber is ignited by means of a spark plug at a predetermined ignition time. The method according to the invention is distinguished in that a pilot injection of a first fuel quantity is injected into the combustion chamber in an intake stroke of the internal combustion engine, said pilot injection forming a homogeneous, lean air/fuel mixture ($\lambda > 1$) in substantially the entire combustion chamber; and in that a main injection of a second fuel quantity is subsequently injected into the combustion chamber in a compression stroke directly before the ignition time, said main injection forming a stratified, rich air/fuel cloud ($\lambda < 1$) in the region of the spark plug.

In the method according to the invention, the fuel quantity injected into the combustion chamber in the post-start phase, that is to say in the time between the engine being started and the lambda control being operational, is divided into two injection quantities. The pilot injection takes place in the intake stroke of the internal combustion engine in order to form a homogeneous, lean air/fuel mixture in the entire combustion chamber. As a result of the fuel injection quantity being considerably leaner compared to that in conventional homogeneous operation, the fuel quantity deposited on the combustion chamber walls and the fuel quantity in the vicinity of the wall, which cannot be involved in the combustion process as a result of quenching, is therefore also considerably reduced. As a result of the reduced fuel quantity which cannot be involved in the combustion process, the emissions of unburned hydrocarbons are reduced considerably, the fuel quantity to be injected is reduced considerably and the required high pressure pump can therefore be of smaller dimensions. The main injection in the compression stroke of the internal combustion engine forms a stratified, rich air/fuel mixture in the region of the spark plug directly before the ignition time, in order to ensure combustion despite the lean fresh charge.

In a preferred embodiment of the invention, the main injection is carried out as a multiple injection with a plurality of stratified injections in rapid succession. Said multiple injection improves the mixture of the fuel, which is injected in a stratified fashion, with the fresh air and the residual exhaust gas, whereby the reliability of combustion is further increased.

In one embodiment of the invention, the main injection is carried out as a double injection with two stratified injections. In this case, the ignition time can occur after the second stratified injection of the main injection or between the first and second stratified injections of the main injection.

In an alternative embodiment of the invention, the main injection is carried out as a triple injection with three stratified injections. In this case, the ignition time can occur after the third stratified injection of the main injection or optionally between the first and second, or between the second and third, stratified injections of the main injection.

In a further embodiment of the invention, the pilot injection generates a slightly lean air/fuel mixture, in particular an air/fuel mixture of $\lambda \approx 1.2$, in the combustion chamber.

The air/fuel mixture after the second stratified injection, averaged across the entire combustion chamber, is preferably between stoichiometric ($\lambda=1$) and slightly lean ($\lambda=1.05$).

The ignition time corresponds to the normal ignition time in a conventional homogeneous operating mode of the internal combustion engine, that is to say it preferably occurs, depending on the operating mode of the internal combustion engine, between approximately 10° CA and approximately 20° CA before ignition top dead center.

In a further embodiment of the invention, the end of the main injection and/or of the first stratified injection of the main injection occurs at approximately 1° CA to 15° CA before the ignition time.

In a further embodiment of the invention, the pilot injection is also carried out as a multiple injection with a plurality of homogeneous injections. This measure further improves the homogeneity of the air/fuel mixture in the entire combustion chamber.

Further features and feature combinations are apparent from the description. Exemplary embodiments of the invention are described below and explained in more detail on the basis of the accompanying drawings:

DESCRIPTION OF PREFERRED
EMBODIMENTS OF THE INVENTION

Figure 1:
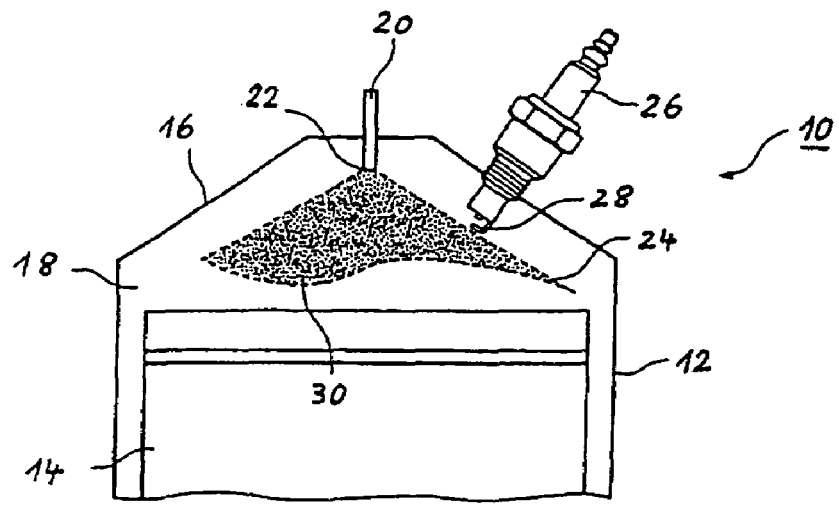
FIG. 1 is a schematic cross-sectional illustration of a cylinder of a spark-ignition internal combustion engine with direct fuel injection where the method according to the present invention can be used.

FIG. 1 shows in a considerably simplified view a cylinder 12 of a spark-ignition internal combustion engine 10 with direct fuel injection. In the cylinder 12, a combustion chamber 18 is delimited by a piston 14 and a cylinder head 16 which closes off the cylinder 12. A fuel injector 20, which can inject fuel into the combustion chamber 18 through a nozzle opening 22, is arranged centrally in the cylinder head 16. A control device (not illustrated) determines, inter alia, the injection times of the fuel, with the associated fuel quantities, and an ignition time at which an air/fuel mixture, which is formed in the combustion chamber, is ignited by means of a spark plug 26 or the like.

When the nozzle opening 22 of the fuel injector 20 is unblocked, the fuel is injected into the combustion chamber 18 in the form of a conical jet 24 with an opening angle of between 70° and 110°. The spark plug 26 is positioned in the combustion chamber 18 such that the electrodes 28 of the spark plug 26 are not wetted by the injected fuel cone 24.

The internal combustion engine 10 illustrated in FIG. 1 preferably operates on the four-stroke cycle. In a first stroke of a working cycle of the internal combustion engine 10, the so-called intake stroke, the combustion chamber 18 is supplied with combustion air through an inlet duct (not illustrated). Here, the piston 14 moves downward to a bottom dead center BDC. In a subsequent compression stroke of the internal combustion engine 10, the piston 14 moves upward from bottom dead center BDC position to an ignition top dead center ITDC position. In a subsequent expansion stroke, the piston 14 moves downward again to the bottom dead center BDC, and in a fourth exhaust stroke, the piston 14 travels upward to a top dead center TDC position while discharging the exhaust gases from the combustion chamber 18.

It is an aim of the method according to the invention to provide an injection strategy for an internal combustion engine which, in a post-start phase of the internal combustion engine, that is to say in the time between engine start-up and the lambda control being operational, and also at very low temperatures, that is in particular at low intake air temperatures, provides for reduced fuel consumption with simultaneously reduced pollutant emissions (in particular of hydrocarbons) and highly reliable combustion at the ignition time. An important special case in this context is the exhaust gas test at an engine start-up temperature of minus 7° C. as is prescribed by law.

The operating period in which the injection strategy, as described below is relevant will be explained on the basis of FIG. 2. The so-called post-start phase T begins after the speed at the end of the start-up phase of the internal combustion engine, that is to say the speed at which starting is completed, has been reached. The low-temperature problems described in the introduction are relevant in this post-start phase. The problems mentioned become less severe as the combustion chamber walls and the piston head warm up. When the lambda sensors reach their operational state, they can take over the task of metering the mixture, and the mixture composition can be adjusted such that the fuel involved in the combustion process together with the fresh air result in a stoichiometrlc air/fuel ratio ($\lambda \approx 1$). The time at which the lambda sensors reach their operational state is dependent on the engine starting temperature, since the sensors can only be brought up to their operating temperature when the sensors have been heated up by the hot exhaust gas to such an extent that no more condensation water can collect on the ceramic bodies of the sensors, since there would otherwise be the danger of stress fractures during heating of the sensors.

Here, a transition takes place from the post-start phase T to the so-called warm-up phase, in which the mixture control which is then possible permits stable operation of the internal combustion engine in the homogeneous operating mode.

Various preferred exemplary embodiments of the invention are explained in more detail on the basis of the illustrations of FIGS. 3 to 6. Herein, the injection processes ES of the internal combustion engine 10 are in each case plotted against the crankshaft angle ° CA.

A significant point of the method according to the invention is the division of the injected fuel into two parts, specifically into a homogeneous pilot injection $M_H$ and a stratified main injection $M_S$. Initially, in the intake stroke of the internal combustion engine 10, a first fuel quantity is injected in a pilot injection $M_H$, so that a homogeneous air/fuel mixture with an air/fuel ratio of $\lambda > 1$ is formed in the entire combustion chamber 18. In contrast to conventional homogeneous injections, a considerably smaller fuel quantity is injected, and a slightly lean air/fuel mixture of for example $\lambda \approx 1.2$ is generated in the entire combustion chamber. In comparison with the rich air/fuel mixture in a conventional homogeneous injection, the quantity of the fuel which condenses on the combustion chamber walls and on the piston head is thus considerably reduced. There is also less evaporated fuel, whereby only a correspondingly smaller amount can be quenched, in the boundary layer in the vicinity of the combustion chamber walls. Since the fuel quantity involved in the combustion process is reduced in this way, the emissions of unburned hydrocarbons are also considerably reduced. The fuel quantity injected is likewise considerably reduced by means of said injection strategy, which, in turn, reduces the size of the high pressure fuel pump needed.

The beginning of injection of the pilot injection $M_H$ in the intake stroke of the internal combustion engine 10 substantially corresponds to the beginning of injection in conventional homogeneous injections. Said beginning of injection should be late enough in the intake stroke that the fuel injection jet does not impinge on the cold piston head, but also early enough so that there is as long a period as possible for homogenization of the air/fuel mixture in the combustion chamber.

Shortly before the ignition time ZT, which corresponds to the normal ignition time in a homogeneous operating mode of the internal combustion engine 10 and, depending on the operating point of the internal combustion engine, occurs between approximately 10° CA and approximately 20° CA before the piston reaches the top dead center position (ITDC), a second fuel quantity is injected, as a stratified injection, into the combustion chamber 18 in a main injection $M_S$ during the compression stroke. In order to ensure, in a jet-guided combustion process, the optimum formation of the injection jet for ignition at the ignition time ZT, the injection time of the main injection $M_S$ is coupled to the ignition time ZT. Said coupling is carried out by means of a spacing angle $\Delta$, which is dependent on the operating point, between the end of the stratified main injection $M_S$ and the ignition time ZT. This spacing angle $\Delta$ is preferably in a crankshaft angle range of approximately 1° CA to approximately 15° CA before the ignition time ZT.

The purpose of the stratified main injection $M_S$ is to form, in the vicinity of the spark plug 26 at the ignition time ZT, a slightly rich ($\lambda < 1$) charge cloud 30, which is reliably combustible despite the high residual exhaust gas content in the combustion chamber 18. Highly reliable combustion is obtained by producing optimum conditions at the spark plug 26 at the ignition time ZT. The flame front can then progress from said region into those regions of the combustion chamber 18 in which the charge mixture is actually flammable but cannot be reliably ignited on account of the high residual exhaust gas rates. Assuming that the combustion speed approximately corresponds to that in conventional homogeneous operation, and ignoring the influence of the lean air/fuel mixture, the combustion efficiency and the torque generated also remain substantially constant.

Figure 2:
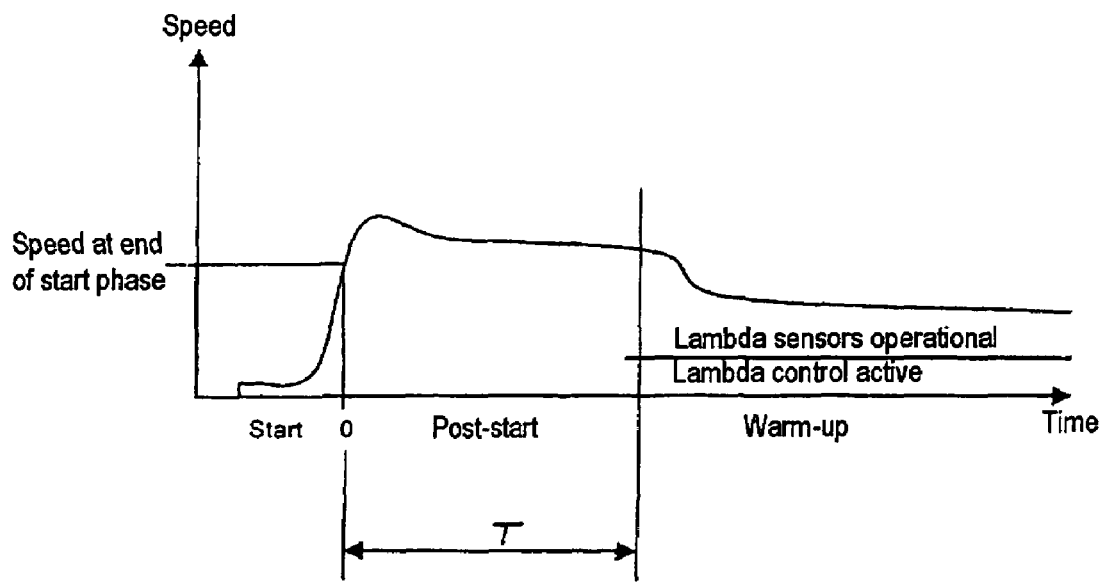
FIG. 2 shows in a schematic illustration the speed of the internal combustion engine over time in order to clarify the relevant time of the operating method according to the invention.

As a result of the injection method according to the invention as illustrated in FIG. 2 and described above, on the one hand, minimal wetting of the combustion chamber walls and of the piston head with fuel and therefore a reduction in the injection quantity is obtained by means of the homogeneous pilot injection $M_H$. This leads, on one hand, to a considerable reduction in the emissions of hydrocarbons, and on the other hand, a reliably combustible charge cloud is provided in the region of the spark plug 26 by means of the stratified main injection $M_S$ at the ignition time ZT, resulting in a stable combustion and thus smooth running of the engine despite a lean charge mixture in the combustion chamber 18 overall. In this way, an operating mode of the internal combustion engine in the post-start phase can be implemented in which the fuel consumption is reduced and the hydrocarbon emissions are simultaneously reduced even at low temperatures.

The air/fuel ratio $\lambda$ after the stratified main injection $M_S$, averaged across the entire combustion chamber 18, is preferably between stoichiometric ($\lambda \approx 1$) and slightly lean ($\lambda \approx 1.05$).

Figure 3:
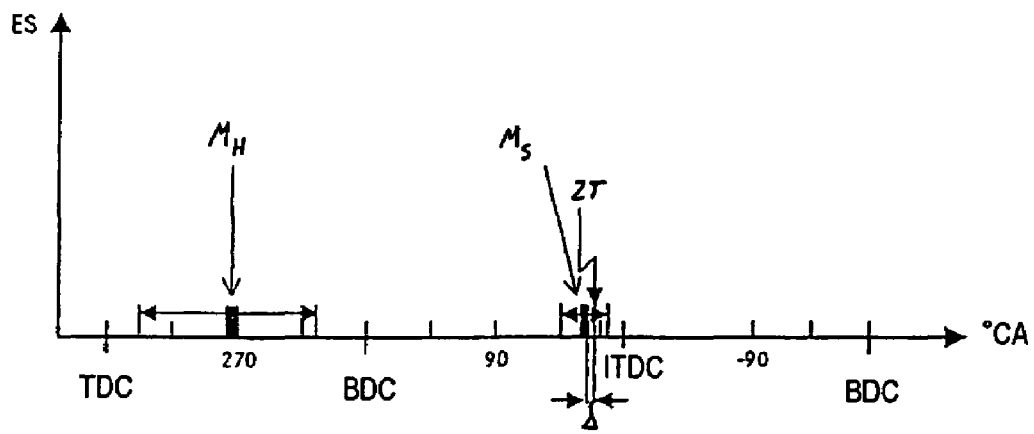
FIG. 3 shows in schematically a first exemplary embodiment of an injection profile of the internal combustion engine of FIG. 1, plotted against the crankshaft angle.
Figure 4:
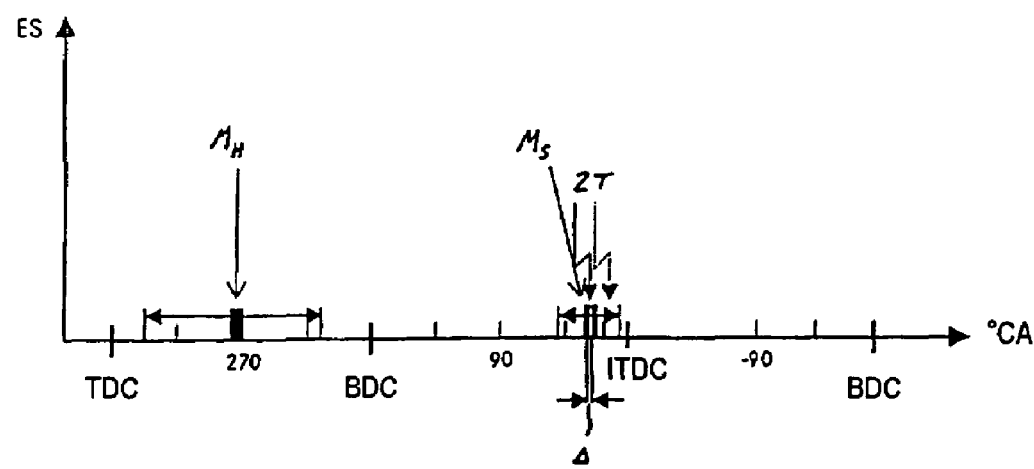
FIG. 4 shows schematically a second exemplary embodiment of an injection profile of the internal combustion engine of FIG. 1, plotted against the crankshaft angle.

While, in the first exemplary embodiment of FIG. 3, the stratified main injection $M_S$ took place in the form of a single injection, in the second exemplary embodiment of FIG. 4, the stratified main injection $M_S$ is carried out directly before the ignition time ZT in the form of a double injection with a first stratified injection and a second stratified injection within a few milliseconds. Because the stratified main injection $M_S$ is carried out in a clocked fashion as a multiple injection, the mixture formation of the rich charge cloud 30 in the region of the spark plug 26, and therefore also the running smoothness of the internal combustion engine 10, is further improved on account of better mixture of the fuel vapor with the fresh air. In addition, the multiple injection also further increases the degree of turbulence in the region of the spark plug 26, and therefore further stabilizes combustion.

As indicated in FIG. 4, the ignition time ZT in the case of a stratified double injection $M_S$ can either occur after the second stratified injection of the main injection $M_S$, or else between the first and the second stratified injection of the main injection $M_S$. Here, the injection time of the main injection $M_S$ is coupled to the ignition time ZT in such a way that the spacing angle Δ between the end of the first stratified injection of the main injection $M_S$ and the ignition time is preferably approximately 1° CA to approximately 15° CA, as a function of the operating point.

The remaining aspects of the second exemplary embodiment and the advantages which can be obtained with said method correspond to those of the first exemplary embodiment of FIG. 3.

Figure 5:
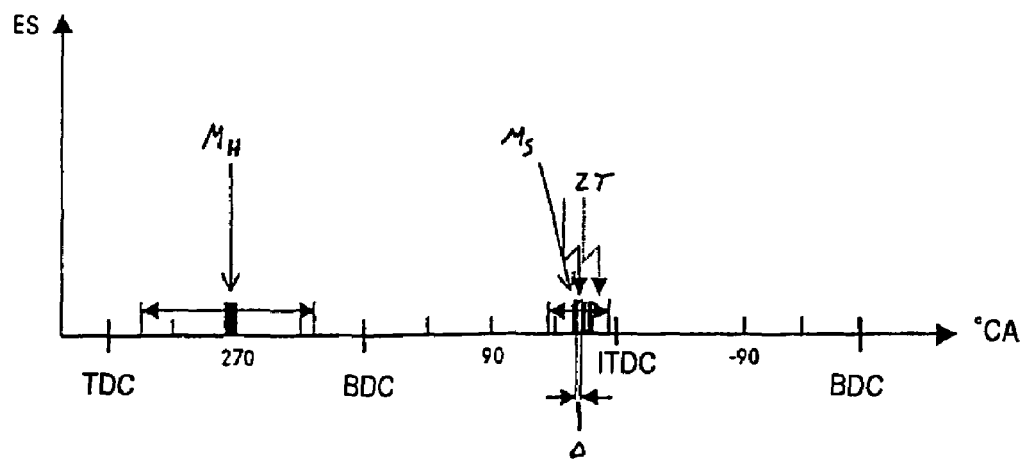
FIG. 5 shows schematically a third exemplary embodiment of an injection profile of the internal combustion engine of FIG. 1, plotted against the crankshaft angle.

While, in the second exemplary embodiment, the main injection $M_S$ is carried out as a double injection with a first and a second stratified injection, the main injection $M_S$ in the third exemplary embodiment of FIG. 5 is carried out as a triple injection with a first, a second and a third stratified injection. The spacing angle Δ between the end of the first stratified injection and the ignition time ZT is also preferably approximately 1° CA to approximately 15° CA in this case.

As illustrated in FIG. 5, the ignition ZT can optionally occur between the first and the second or between the second and the third stratified injections of the stratified main injection $M_S$, or else optionally after the third stratified injection of the main injection $M_S$.

Figure 6:
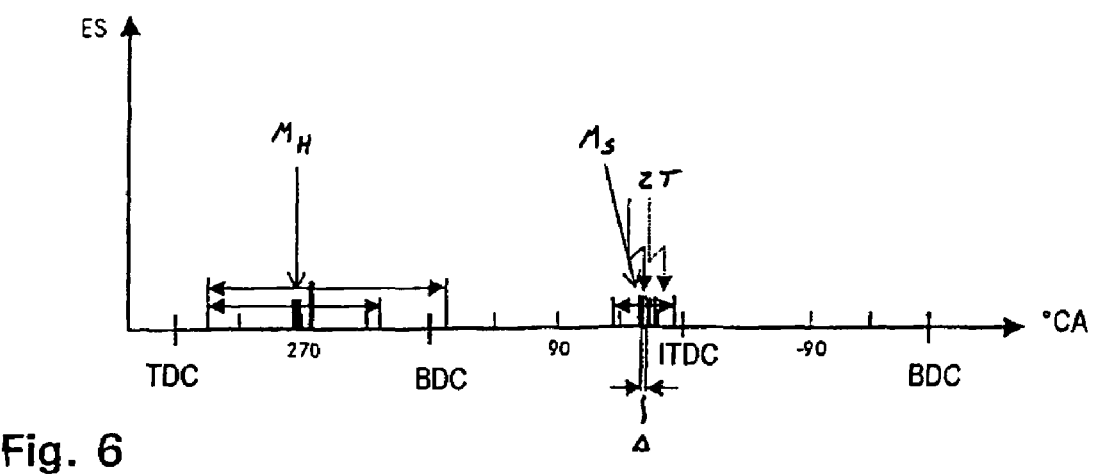
FIG. 6 shows schematically a fourth exemplary embodiment of an injection profile of the internal combustion engine of FIG. 1, plotted against the crankshaft angle.

The fourth exemplary embodiment of the invention, as illustrated in FIG. 6, differs from the third exemplary embodiment of FIG. 5 in that the homogeneous pilot injection $M_H$ is also carried out as a multiple injection, as a double injection in the exemplary embodiment shown. Said homogeneous double injection further improves the homogeneity of the air/fuel mixture in the entire combustion chamber.

It is to be expressly pointed out at this stage that said homogeneous multiple injection $M_H$ of FIG. 6 can also be combined with all the other exemplary embodiments shown, without this being explicitly illustrated.

The present invention is particularly suitable for a spark-ignition internal combustion engine with direct fuel injection. The advantages of the present invention are in particular the reduced pollutant emissions in the post-start phase as a result of reduced wetting of the combustion chamber walls and of the piston head with condensed fuel; a reduction in the fuel consumption as a result of a reduction in the required enrichment of the mixture in the post-start phase; an improvement in the running smoothness of the internal combustion engine as a result of an improvement in the reliability of combustion of the locally rich fresh mixture in the region of the spark plug at the ignition time; and smaller dimensions of the high pressure pump required for providing the fuel feed quantity required for a cold start, all resulting in cost saving.

What is claimed is:

1. A method for operating a spark-ignition internal combustion engine (10) including a combustion chamber (18) with a fuel injector (20) for direct fuel injection into a combustion chamber (18) and a spark plug (26) for the ignition of the fuel with combustion air supplied to the combustion chamber (18) in a post-start phase (T) during a period between the start-up phase of the internal combustion engine and before the lambda sensors is operational, wherein the engine is operating at low temperatures, said method comprising the steps of:

Supplying the combustion air to the combustion chamber (18) in an engine intake stroke; injecting a pilot fuel quantity by means of the fuel injector (20) into the combustion air supplied to the combustion chamber (18) during the intake stroke of the internal combustion engine (10), said pilot injection ($M_H$) forming a homogeneous, lean air/fuel mixture (λ<1) in substantially the entire combustion chamber (18); subsequently injecting in a main injection ($M_S$) a second fuel quantity into the combustion chamber (18) during a compression stroke directly before the ignition time (ZT), said main fuel injection ($M_S$) being carried out as a double injection each forming a stratified, rich air/fuel mixture (λ<1) in the region of the spark plug (26) and igniting the stratified rich air/fuel mixture by means of the spark plug (26) at a predetermined ignition time (ZT) after the second stratified fuel injection.

2. The method as claimed in claim 1, wherein the pilot injection ($M_H$) generates a slightly lean air/fuel mixture, in particular an air/fuel mixture of λ≈1.2, in the combustion chamber (18).

3. The method as claimed in claim 1, wherein, averaged across the entire combustion chamber (18), the air/fuel mixture after the second stratified injection ($M_S$) is between stoichiometric (λ≈1) and slightly lean (λ≈1.05).

4. The method as claimed in claim 1, wherein the ignition time (ZT) occurs between approximately 10° CA and approximately 20° CA before an ignition top dead center (ITDC).

5. The method as claimed in claim 1, wherein the end of the main injection ($M_S$) or of the first stratified injection of the main injection ($M_S$) occurs at approximately 1° CA to 15° CA before the ignition time (ZT).

6. The method as claimed in claim 1, wherein also the pilot injection ($M_H$) is carried out as a multiple injection with a plurality of homogeneous injections.

7. A method for operating a spark-ignition internal combustion engine (10) including a combustion chamber (18) with a fuel injector (20) for direct fuel injection into a combustion chamber (18) and a spark plug (26) for the ignition of the fuel with combustion air supplied to the combustion chamber (18) in a post-start phase (T) during a period between the start-up phase of the internal combustion engine and before the lambda sensors is operational, wherein the engine is operating at low temperatures, said method comprising the steps of:

Supplying the combustion air to the combustion chamber (18) in an engine intake stroke; injecting a pilot fuel quantity by means of the fuel injector (20) into the combustion air supplied to the combustion chamber (18) during the intake stroke of the internal combustion engine (10), said pilot injection ($M_H$) forming a homogeneous, lean air/fuel mixture (λ<1) in substantially the entire combustion chamber (18); subsequently injecting in a main injection ($M_S$) a second fuel quantity into the combustion chamber (18) during a compression stroke directly before the ignition time (ZT), said main fuel injection ($M_S$) being carried out as a triple injection each forming a stratified, rich air/fuel mixture (λ<1) in the region of the spark plug (26) and igniting the stratified rich air/fuel mixture by means of the spark plug (26) at a predetermined ignition time (ZT) after the third stratified fuel injection.

8. The method as claimed in claim 7, wherein, averaged across the entire combustion chamber (18), the air/fuel mixture after the third stratified injection ($M_S$) is between stoichiometric ($\lambda \approx 1$) and slightly lean ($\lambda \approx 1.05$).

9. The method as claimed in claim 7, wherein the ignition time (ZT) occurs between approximately 10° CA and approximately 20° CA before an ignition top dead center (ITDC).

10. The method as claimed in claim 7, wherein the end of the main injection ($M_S$) or of the first stratified injection of the main injection ($M_S$) occurs at approximately 1° CA to 15° CA before the ignition time (ZT).

11. The method as claimed in claim 7, wherein also the pilot injection ($M_H$) is carried out as a multiple injection with a plurality of homogeneous injections.

* * * * *